Sept. 2, 1924.
J. A. MARTIN
1,507,497
CAFE SYSTEM
Filed Aug. 21, 1922
2 Sheets-Sheet 1
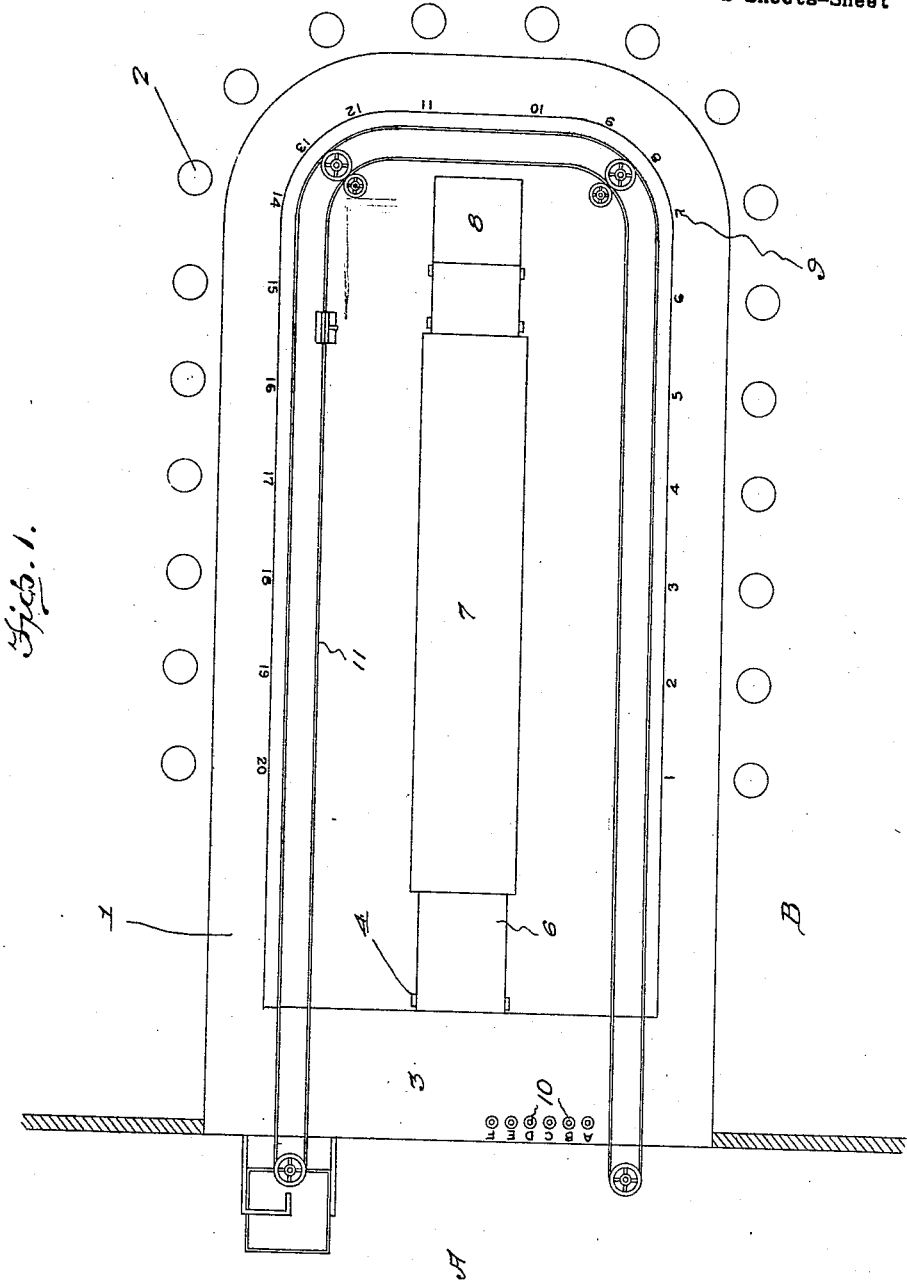
Jas. A. Martin
INVENTOR
BY Victor J. Evans
ATTORNEY
WITNESS:

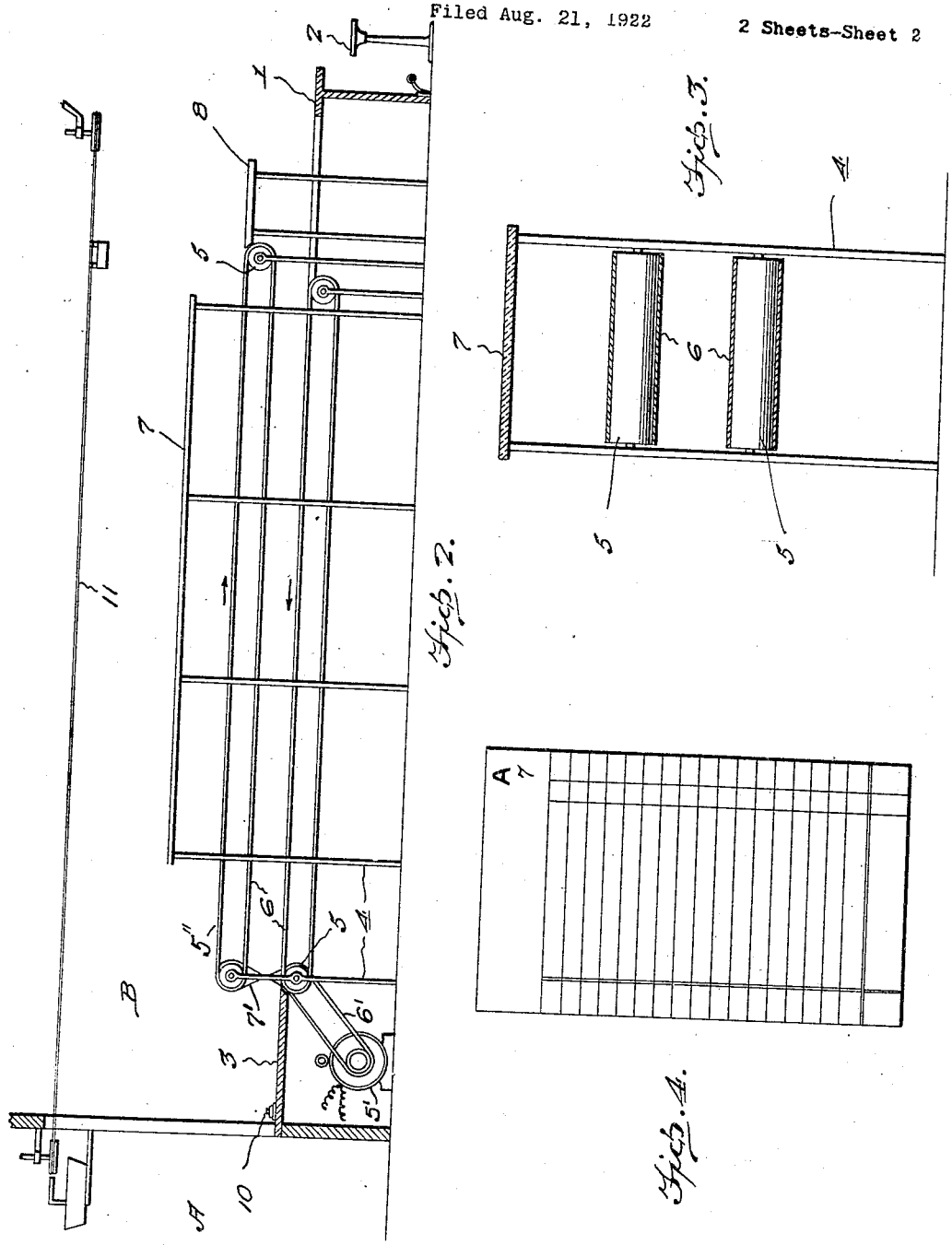
Sept. 2, 1924.
J. A. MARTIN
CAFE SYSTEM
Filed Aug. 21, 1922
1,507,497
2 Sheets-Sheet 2

Patented Sept. 2, 1924.

1,507,497

UNITED STATES PATENT OFFICE.

JAMES AVERY MARTIN, OF BIRMINGHAM, ALABAMA.

CAFÉ SYSTEM.

Application filed August 21, 1922. Serial No. 583,398.

*To all whom it may concern:*

Be it known that I, JAMES A. MARTIN, a citizen of the United States, residing at Birmingham, in the county of Jefferson and State of Alabama, have invented new and useful Improvements in Café Systems, of which the following is a specification.

This invention relates to means for facilitating the serving of customers at cafés and the like, the general object of the invention being to provide conveyors for taking the dishes from the kitchen to a point where they can be served to the customers and for returning the empty dishes back to the kitchen.

Another object of the invention is to provide a trolley system for taking orders to and from the kitchen.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic plan view showing the invention in use.

Figure 2 is an elevation.

Figure 3 is a vertical sectional view through the frame and conveyors.

Figure 4 is a detail view of one of the order slips.

In these views A indicates a part of the kitchen where the food is prepared and B a room or compartment where the food is served to the customers. The drawings show this room as containing a continuous lunch counter 1, though it will of course be understood that tables may take the place of the counter, or both the tables and counter used. Seats 2 are arranged around the counter and this counter is formed with the serving counter 3, as shown, which is so placed that the cooks in the kitchen may readily place the food to be served thereon. A frame 4 is arranged within the space formed by the counter and this frame supports the rollers 5 for the endless conveyors the upper of which is indicated by the reference numeral 5'' and the lower by the reference numeral 6. The frame may be provided with a flat top, as shown at 7, which acts as a counter and a receiving table 8 is placed adjacent the outer end of the top conveyor which serves to convey the food from the kitchen to said table. The lower conveyor 6 is actuated in an opposite direction from the top conveyor 5'' and acts to return the empty dishes to the serving counter. The conveyors are operated by the electric motor 5' through the medium of the belts 6' and 7' respectively, as clearly shown in Figure 2 of the drawings.

From the above it will be seen that it is simply necessary for the cooks to place the dishes upon the top conveyor 5'' which will convey them to the receiving table and from this point the waiters serve the customers. The empty dishes are placed by the waiters upon the lower conveyor 6 so that they will return to the kitchen.

Each waiter is supplied with order slips lettered A, B, C, D, etc., so as to designate the waiter sending in an order. Each place at the counter is to be numbered, as indicated at 9, and the number written on the order so that the waiter can tell where the order is to go. This order is sent back to the kitchen on the return conveyor 6, filled and sent back on the conveyor 5''. When the order is sent back the waiter to whom it belongs is notified by an electric signal 10 from the serving counter so that he will be on the lookout for it. If the order requires that one portion be served at one time and the balance served later the filled portion of the order could be checked and the order returned to the kitchen to be completed.

I may provide a trolley system which is shown generally at 11, for transmitting orders to and from the kitchen, instead of utilizing the conveyors for this purpose as above set forth. This trolley system may be the same as used in department stores for conveying cash to and from the cashier.

What I claim is:—

A café system of the character described comprising a substantially U-shaped table, disposed within a dining room and having one end arranged adjacent an opening formed in the wall of a kitchen, a flat top frame interposed between the sides of the table, a pair of conveyors arranged in superposed horizontal relation between the sides and below the flat top of the frame, a receiving table transversely disposed with relation to the conveyors and having one edge arranged adjacent one end of the upper conveyor for automatically receiving articles therefrom, a serving table having one edge disposed adjacent the opposite end of the lower conveyor and transverse to the end of the U-shaped table arranged adjacent to the opening and a motor operating the conveyors as and for the purpose specified.

In testimony whereof I affix my signature.

JAMES AVERY MARTIN.